(No Model.) 7 Sheets—Sheet 1.

J. DES BRISAY.
LOCOMOTIVE.

No. 409,936. Patented Aug. 27, 1889.

WITNESSES:
Chas. Nida
C. Sedgwick

INVENTOR:
J. Des Brisay
BY Munn & Co.
ATTORNEYS.

(No Model.)

J. DES BRISAY.
LOCOMOTIVE.

No. 409,936. Patented Aug. 27, 1889.

(No Model.) 7 Sheets—Sheet 6.

J. DES BRISAY.
LOCOMOTIVE.

No. 409,936. Patented Aug. 27, 1889.

Fig. 10.

WITNESSES:
Chas. Nice
C. Sedgwick

INVENTOR:
J. Des Brisay
BY Munn & Co.
ATTORNEYS.

(No Model.)  
7 Sheets—Sheet 7.

J. DES BRISAY.
LOCOMOTIVE.

No. 409,936. Patented Aug. 27, 1889.

WITNESSES:
Chas. Nida
C. Sedgwick

INVENTOR:
J. Des Brisay
BY Munn & Co.
ATTORNEYS.

UNITED STATES PATENT OFFICE.

JAMES DES BRISAY, OF VANCOUVER, BRITISH COLUMBIA, CANADA.

LOCOMOTIVE.

SPECIFICATION forming part of Letters Patent No. 409,936, dated August 27, 1889.

Application filed August 16, 1888. Serial No. 282,844. (No model.)

*To all whom it may concern:*

Be it known that I, JAMES DES BRISAY, of Vancouver, in the Province of British Columbia and Dominion of Canada, have invented certain new and useful Improvements in Locomotives, of which the following is a full, clear, and exact description.

The invention relates to compound locomotives and to valve-gears, such as shown in Patent No. 381,678, granted to me April 24, 1888, and also in my patent, No. 390,460, October 2, 1888.

The object of the invention is to provide certain new and useful improvements in locomotives, by which the steam is more economically and advantageously used, being condensed, if desired, and the water of condensation returned to the boiler.

The invention consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Fig. 3 is a front elevation of the same, parts being broken out and parts in section. Fig. 11 is a plan view of the cylinders and valves, with parts in section, on the line $x$ $x$ of Fig. 12; and Fig. 12 is an end view of the same.

The improved locomotive A is provided with the two high-pressure cylinders B and C, fastened to the saddle D on each side of the boiler E, supported in the usual manner at its front end by the said saddle D. The high-pressure cylinders B and C are connected in the usual manner to the sets of driving-wheels F G and F' G', respectively, as is plainly shown in Fig. 2.

Figure 1:
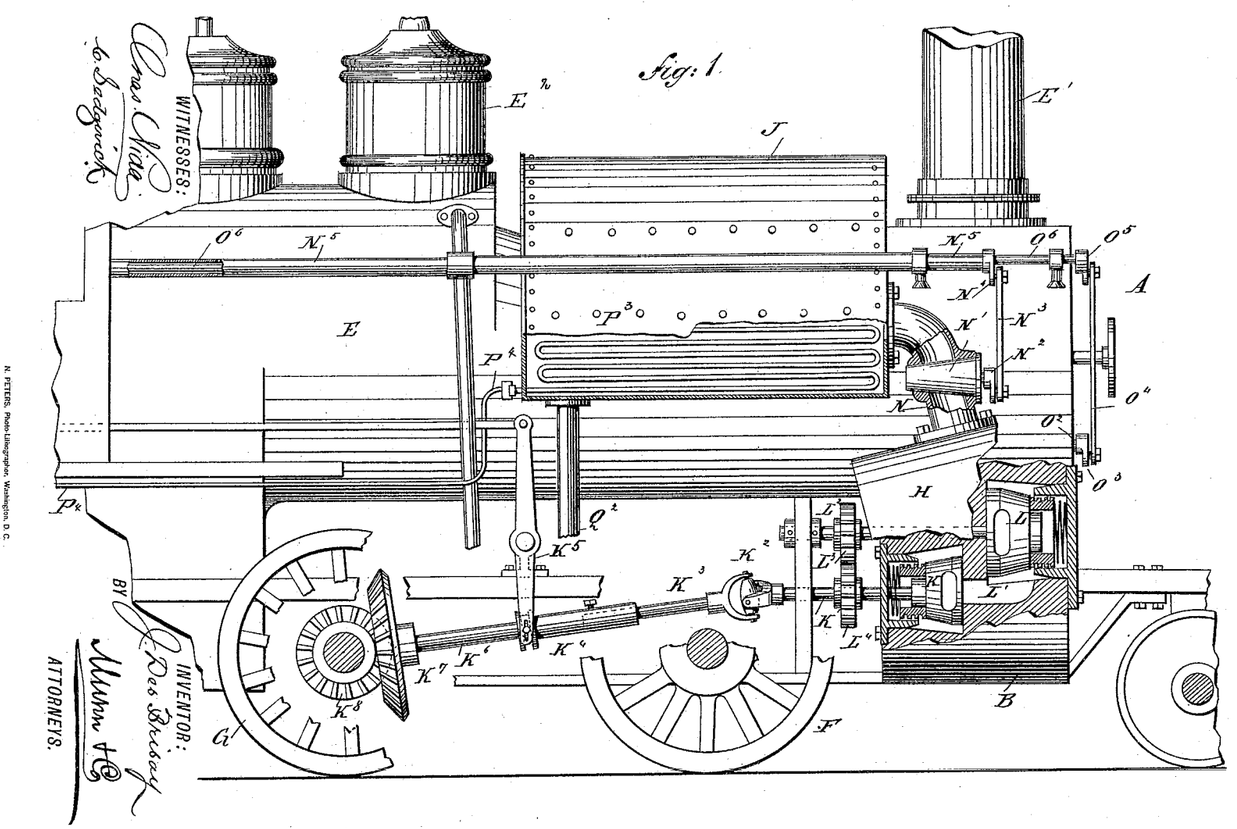
Figure 1 is a side elevation, with parts in section, of a locomotive provided with the improvements.
Figure 2:
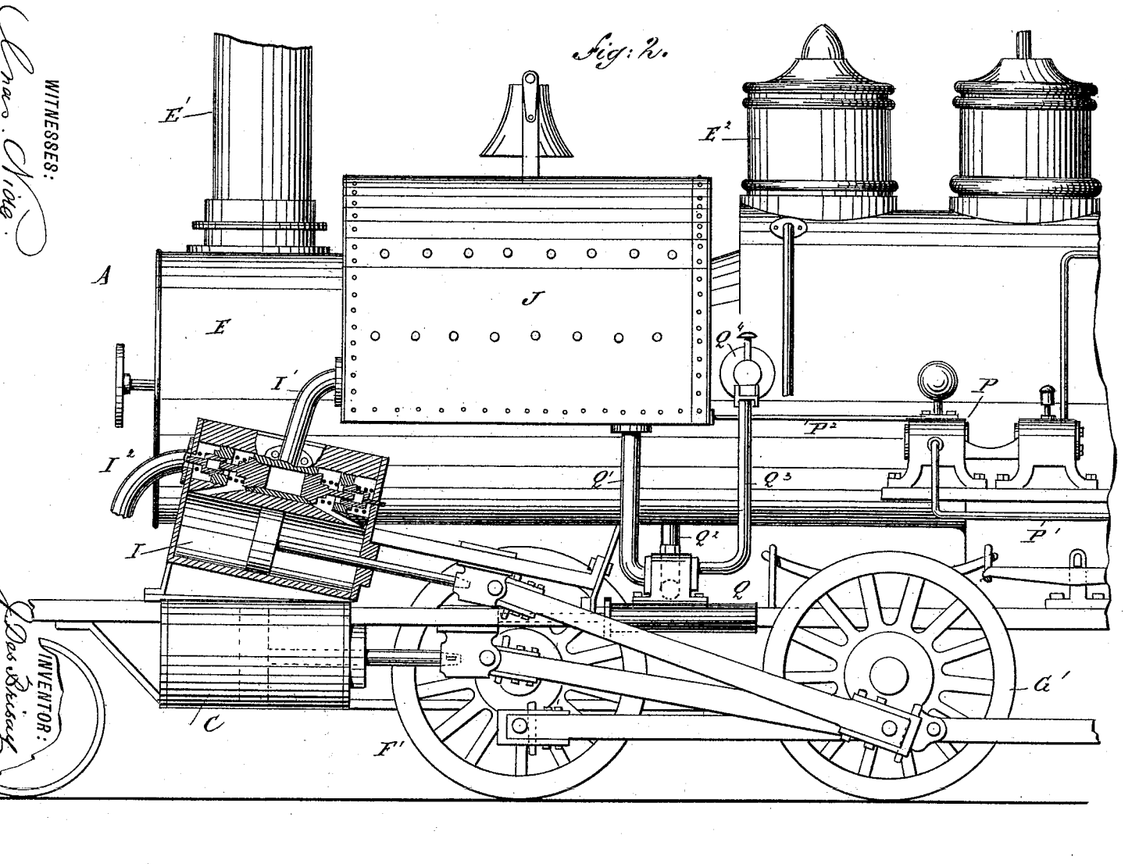
Fig. 2 is a side elevation, with parts in section, of the other side of the locomotive provided with the improvements.

Above the high-pressure cylinder B is located, in an inclined position, (see Fig. 1,) the low-pressure cylinder H, and above the high-pressure cylinder C is located the air-pump I of any approved construction, and connected with the crank-pin of the driving-wheel G', as illustrated in Fig. 2. The crank-pin of the driving-wheel G is connected in a similar manner, the connection not being shown, with the piston of the low-pressure cylinder H, so that the piston of the said low-pressure cylinder H imparts its motion to the crank-pin of the driving-wheel G in conjunction with the action of the piston of the high-pressure cylinder B. The air-pump I serves to maintain a vacuum in the condenser J, shaped in the form of a saddle and located on top of the boiler E between the smoke-stack E' and the sand-box $E^2$, as is plainly shown in the drawings, so that the said condenser J does not obstruct the engineer's view of the track.

The two high-pressure cylinders B and C are controlled by the rotary valve K, which is fully shown and described in the patent, No. 381,678, above referred to, and hence a further description of the said valve and its ports is deemed unnecessary. The valve K is secured on a valve-stem K', extending rearward and connected by a universal joint $K^2$ with a shaft $K^3$, carrying a sleeve $K^4$, operated by a lever $K^5$, fulcrumed on the frame of the locomotive, as in said Patent No. 381,678, and held under the control of the engineer in the cab. The sleeve $K^4$ is connected with the shaft $K^6$, carrying the beveled gear-wheel $K^7$, meshing into a bevel gear-wheel $K^8$, secured on the shaft of the set of driving-wheels G and G'. The operation and detail construction of the sleeve $K^4$, the shafts $K^3$ $K^6$, and the lever $K^5$ are fully shown and described in my patent, No. 390,460, and therefore it suffices to say that the said lever $K^5$ serves to reverse the motion of the valve K in order to run the locomotive backward. The valve K exhausts into a channel L', leading to the rotary valve L, which is similar in construction to the valve K and connects with the low-pressure cylinder H, so that the exhaust-steam from the high-pressure cylinders B and C passes through the valve L into the low-pressure cylinder H, and the exhaust from the low-pressure cylinder H passes through the valve L into a pipe N, connecting with the condenser J. The rotary valve L is secured on a shaft $L^2$, carrying a gear-wheel $L^3$, meshing into a gear-wheel $L^4$, secured on the shaft $K'$ of the rotary valve K, so that when the said valve K is rotated the valve L is rotated simultaneously.

In the pipe N is held a valve $N'$, connected by its valve-stem with a crank-arm $N^2$, pivotally connected by a link $N^3$ with a crank-arm $N^4$, secured to the hollow shaft $N^5$, mounted to rotate in suitable bearings on the boiler E and extending into the cab of the locomotive, being turned by suitable means secured to the inner end of the said hollow shaft by the engineer in the cab, the said hollow shaft $N^4$ serving at the same time as a hand-rail. From the pipe N and the valve $N'$ leads a pipe $N^6$ into the smoke-box of the boiler, discharging at its upper end into the smoke-stack $E'$, so that when the engineer turns the shaft $N^5$ the exhaust from the low-pressure cylinder H, instead of passing to the condenser J, passes through the valve $N'$ into the said pipe $N^6$ and into the smoke-stack $E'$ to furnish additional draft in the boiler-flues. The steam-passage $L'$ from the rotary valve K to the rotary valve L also connects with a nozzle O, held in the smoke-box of the boiler E directly under the smoke-stack $E'$.

In the nozzle O is located a valve $O'$, provided with a valve-stem $O^2$, on which is secured a crank-arm $O^3$, pivotally connected by a link $O^4$ with a crank-arm $O^5$, secured to the outer end of a shaft $O^6$, mounted to rotate in the hollow shaft $N^5$, and also extending into the cab of the locomotive to be under the control of the engineer. When the engineer operates said shaft $O^6$, he can connect the passage $L'$ with the nozzle O, so that the exhaust-steam from the high-pressure cylinders B and C passes from the valve K through the passage $L'$ into the nozzle O and into the smoke-stack $E'$ of the boiler E.

Figures 4, 5, 6, 7, 8:
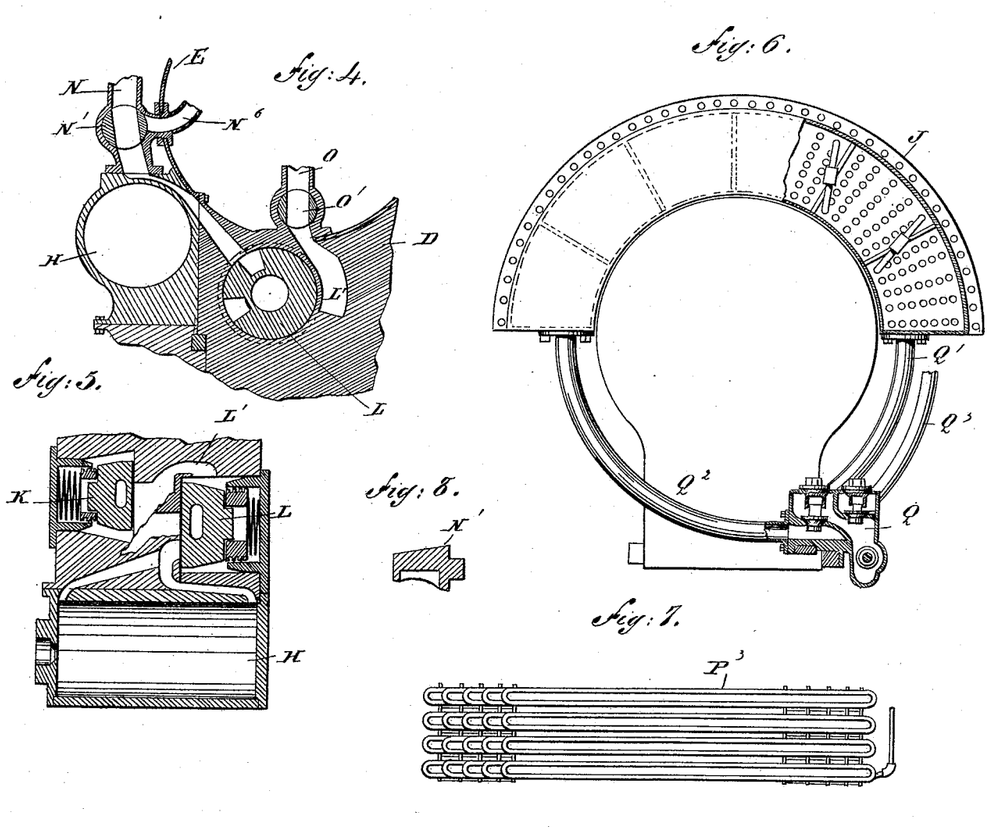
Fig. 4 is a transverse section of the low-pressure cylinder and its valve.
Fig. 5 is a sectional plan view of the same, also showing the valve for the high-pressure cylinders.
Fig. 6 is an end elevation, partly in section, of the condenser.
Fig. 7 is a side elevation of one section of coil for the condenser.
Fig. 8 is a sectional elevation of part of one of the valves.

On the left side of the locomotive-boiler E is placed a steam-pump P of any approved construction, connected by a pipe $P'$ with the water-supply tank or tender of the locomotive. The pump P is also provided with a discharge-pipe $P^2$, which leads into the condenser J and forms a number of coils $P^3$, connected with each other, as is more fully illustrated in Figs. 6 and 7. The outlet of the coils of pipe $P^3$ is on the other side of the condenser J, and is connected with a pipe $P^4$, extending toward the rear and leading into the water-supply tank or tender at the opposite side from that on which the pipe $P'$ starts.

The pump P serves to circulate cold water from the tank or tender through the condenser J, and back again into the tank or tender.

The water of condensation from the condenser J passes into the pipes $Q'$ and $Q^2$, connected to the bottom of the condenser J, and leading to a pump Q of any approved construction, and operated from the cross-head of the high-pressure cylinder C, as is plainly shown in Fig. 2. The outlet-pipe $Q^3$ of the pump Q connects with a check-valve $Q^4$, discharging into the water-compartment of the boiler E. When the locomotive is in operation, the said pump Q pumps the water of condensation from the condenser J into the boiler E. The air-pump I is connected by a pipe $I'$ with the front end of the condenser J above its bottom, and through which pipe $I'$ the vapors pass from the condenser J into the air-pump, and are discharged by the latter through the outlet-pipe $I^2$ into the open air, or into the smoke-box, if desired.

The operation is as follows: When the valve $O'$ in the exhaust-nozzle O is closed, and the valve $N'$ in the pipe N connects the valve L with the condenser J, and the operator admits live steam in the usual manner to the valve K, then the latter opens alternately into the high-pressure cylinders B and C, and thereby the locomotive is propelled forward by the action of the said high-pressure cylinders and their connections on the sets of drive-wheels F G and $F'$ $G'$. The exhaust-steam from the high-pressure cylinders B and C passes through the said valve K into the channel $L'$, and from the latter through the valve L into the low-pressure cylinder H, which transmits its power to the crank-pin of the main driving-wheel G. The exhaust-steam from the low-pressure cylinder passes through the valve L into the pipe N, and from the latter through the valve $N'$ into the condenser J. The steam in passing into the condenser J comes in contact with the coils of pipe $P^3$, through which cold water circulates, as above described, by the action of the steam-pump P. The exhaust-steam is thus condensed, and the water of condensation passes through the pipes $Q'$ and $Q^2$ into the pump Q, operated from the cross-head of the high-pressure cylinder C and discharging the water of condensation through the pipe $Q^3$ and the check-valve $Q^4$ into the water-compartment of the boiler. Thus the locomotive works with high and low pressure, and at the same time condenses the exhaust-steam and returns the water of condensation to the boiler. When the engineer in the cab of the locomotive turns the shaft $N^5$, the crank-arm $N^4$ on the said shafts imparts a turning motion to the crank-arm $N^2$ by the link $N^3$, and thereby the valve $N'$ is turned so as to connect the exhaust of the rotary valve L with the pipe $N^6$. The exhaust-steam from the low-pressure cylinder H now, instead of passing to the condenser J, passes through the valve $N'$ into the pipe $N^6$ and into the smoke-stack $E'$. The operator may also set the low-pressure cylinder H out of action by turning the shaft $O^6$ so that its crank-arm $O^5$ turns the crank-arm $O^3$ by the link $O^4$, whereby the valve $O'$ is turned and connects the channel L' with the exhaust-nozzle O. The exhaust-steam from the high-pressure cylinders B and C passes through the valve K into the said channel L', and from the latter through the valve O' into the exhaust-nozzle O in the smoke-box of the boiler and into the smoke-stack E'. The motion of the valves K and L may be reversed by the engineer changing the position of the lever K⁵, so that the sleeve K⁴ turns the valve K in the manner described in the Patent No. 390,460, above referred to. As the shaft K' of the valve K is connected with the shaft L² of the valve L, the latter is also reversed simultaneously with the reversal of the valve K. The apparent excess of power developed on the right-hand side of the locomotive by the high-pressure cylinder B and the low-pressure cylinder H can be compensated for by correspondingly increasing the diameter of the high-pressure cylinder C over that of the high-pressure cylinder B.

Figure 9:
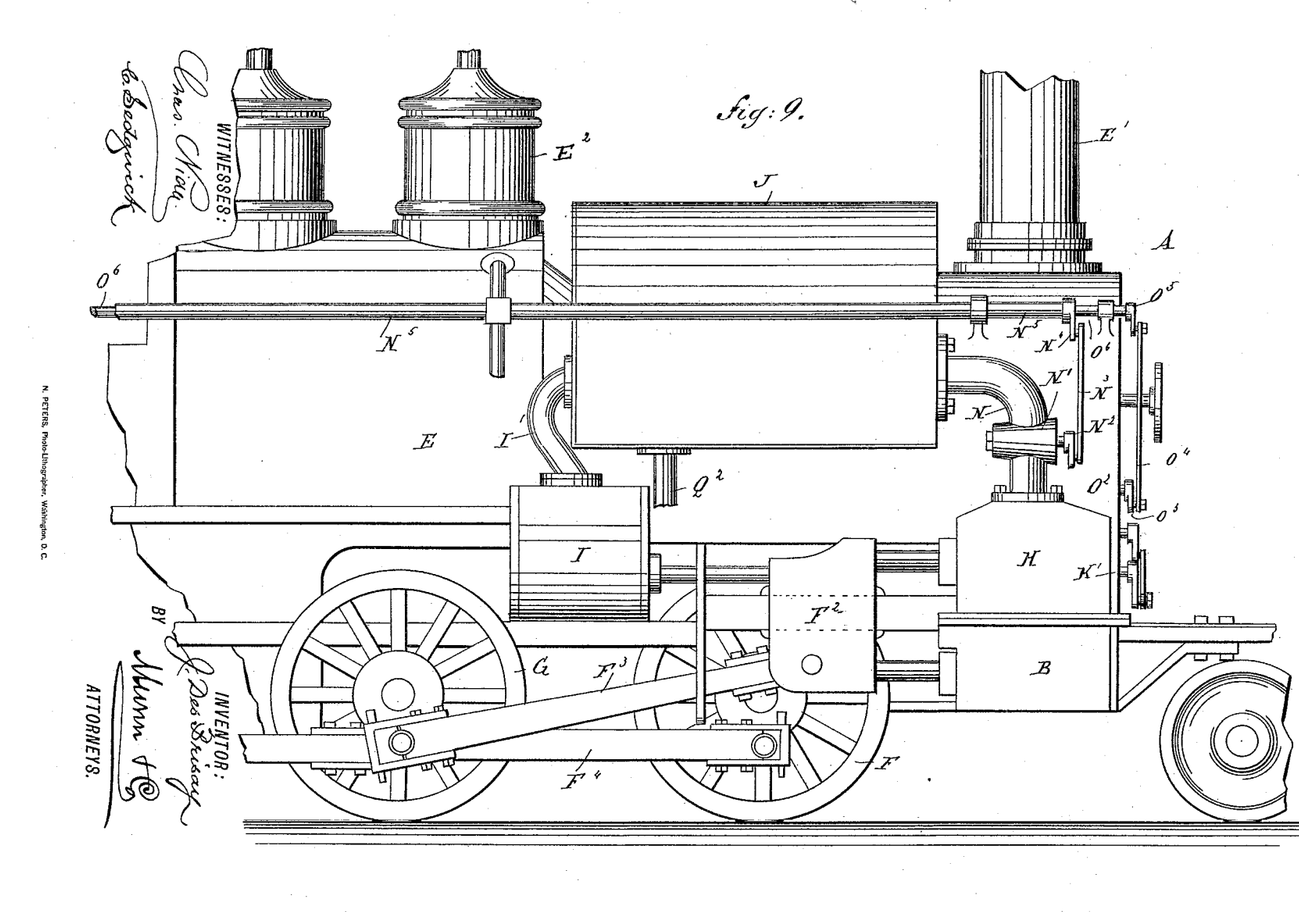
Fig. 9 is a side elevation of a modified form of the improvement.
Figure 10:
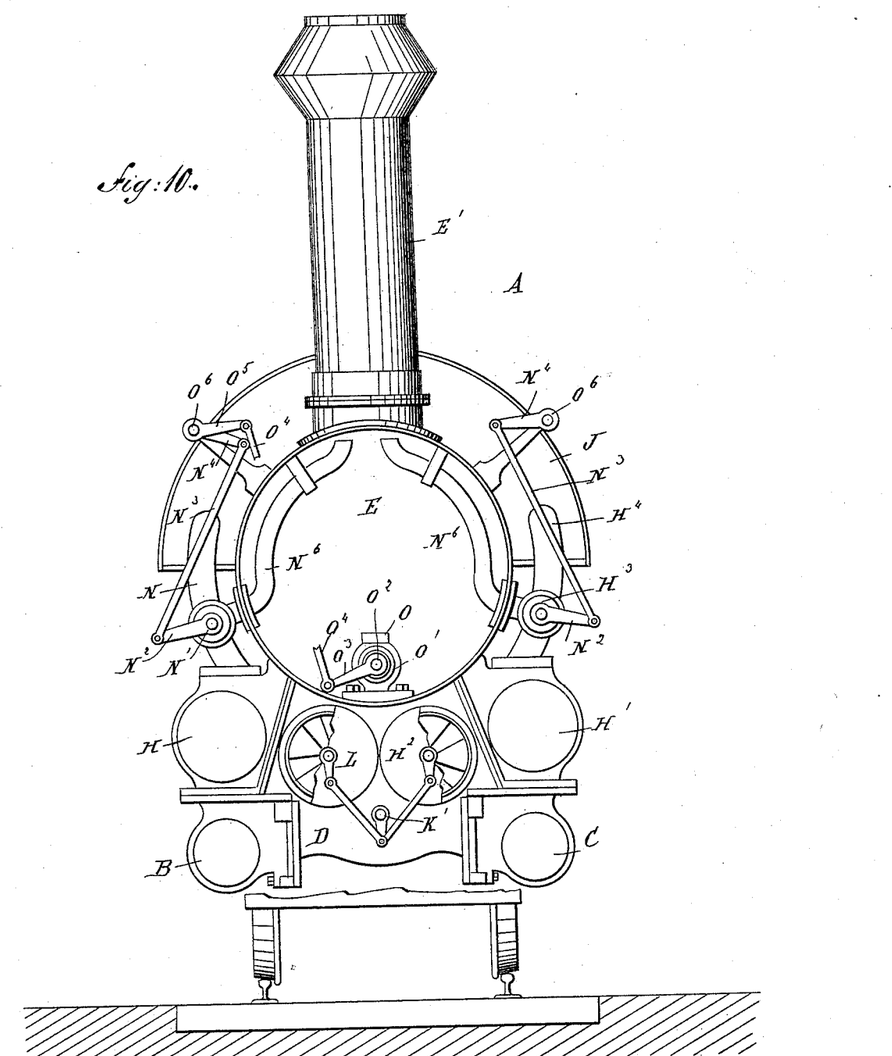
Fig. 10 is a front end elevation of the same with parts broken out.

In the modification shown in Figs. 9, 10, 11, and 12 the locomotive is provided with the additional low-pressure cylinder H', located parallel with and above the high-pressure cylinder C in place of the air-pump I. An additional valve H² is placed in the saddle for supplying steam to the low-pressure cylinder H' from the main valve K, and also for exhausting the steam from the low-pressure cylinder H' in the usual manner, as the valve L discharges its steam from the low-pressure cylinder H, above described. The low-pressure cylinder H is placed above and parallel with the high-pressure cylinder B, and the piston-rods of the cylinders B and H are connected to a common cross-head F², mounted to slide in suitable bearings on the locomotive-frame. Said cross-head is directly connected with the piston-rod of the air-pump I, placed on the right-hand side of the locomotive in line with the low-pressure cylinder H, as is shown in Fig. 9. The air-pump I is constructed and connected with the condenser J in the manner formerly described. The cross-head F² is further connected by a pitman F³ with the driving-wheel G, and the latter is connected with the front driving-wheel F by the connecting-rod F⁴. In a similar manner the high and low pressure cylinders C and H' on the left-hand side of the locomotive are connected with the respective driving-wheels G' and F'. The valve K, controlling two of the high-pressure cylinders B and C, is located in the saddle between the said cylinders, and the valves L and H², for controlling the low-pressure cylinders H and H', are located above the said valve K, as is plainly shown in Figs. 11 and 12. The valve K is operated from one of the axles of the drive-wheels in the manner before described, and the valves L and H² are operated from the valve-stem K' of the valve K by suitable mechanism, either gear-wheels, crank-arms, or eccentrics, or by both crank-arms and eccentrics combined, as shown in Figs. 11 and 12.

It is understood that the valve K controls the high-pressure cylinders B and C, and the valves L and H² control the low-pressure cylinders H and H', deriving their steam from the valve K and discharging the exhaust-steam either into the condenser J or into the smoke-stack E' in the same manner as above described in reference to the valve L—that is, the same mechanism for operating the valve N' in the exhaust-pipe N is duplicated on the left-hand side of the locomotive for controlling the valve H³ in the exhaust-pipe H⁴, also leading to the condenser J. It will further be seen that by the arrangement above described I gain the additional power of the second low-pressure cylinder H', and at the same time I am enabled to construct the locomotive more symmetrically, as is plainly shown by reference to Figs. 2 and 9.

Having thus described my invention, what I claim as new, and desire to secure by Letters Patent, is—

1. The combination, with two high-pressure cylinders, a rotary valve controlling both cylinders, a passage leading from said valve into the smoke-box, and a valve therefor, of the low-pressure cylinder and a passage leading from said rotary valve thereto, substantially as set forth.

2. In a locomotive, the combination, with two high-pressure cylinders and two low-pressure cylinders, of a rotary valve controlling both high-pressure cylinders and two rotary valves deriving steam from the first-named rotary valve and controlling the said two low-pressure cylinders, substantially as shown and described.

3. In a locomotive, the combination, with two high-pressure cylinders and two low-pressure cylinders, all connected with the driving-wheels, of a rotary valve controlling the inlet and exhaust steam of the said high-pressure cylinders, two additional rotary valves connected by a passage with the exhaust-port of the said first-named rotary valve, said two rotary valves controlling the low-pressure cylinders, and a condenser into which the exhaust-steam from the said two rotary valves is discharged, substantially as shown and described.

4. In a locomotive, the combination, with two high-pressure cylinders connected with the drive-wheels, of a rotary valve controlling the inlet and exhaust steam of the said cylinders, two rotary valves connected with the exhaust-port of said first-named rotary valve, low-pressure cylinders connected with the driving-wheels and controlled by the said two valves, pipes leading from the exhaust of the said two rotary valves, and a condenser into which said pipes discharge, substantially as shown and described.

5. In a locomotive, the combination, with two high-pressure cylinders connected with the driving-wheels, of a rotary valve controlling the inlet and exhaust steam of the said cylinders, two rotary valves connected with the exhaust-port of the first rotary valve and operating simultaneously with the said first-named valve, low-pressure cylinders connected with the driving-wheels and controlled by the said two valves, pipes leading from the exhaust of the said two rotary valves, a plug-valve in each of the said pipes, and branch pipes leading from the said plug-valves to the smoke-stack, substantially as shown and described.

6. In a locomotive, the combination, with two high-pressure cylinders connected with the driving-wheels, of a rotary valve controlling the inlet and exhaust steam of the said cylinders, two rotary valves connected with the exhaust-port of the said first-named rotary valve, low-pressure cylinders connected with the drive-wheels and controlled by the said two valves, a condenser into which the exhaust-steam from the said two rotary valves is discharged, an air-pump operated from one of the driving-wheels and connected with the said condenser to exhaust its vapors, and a pump connected with the said condenser for returning the water of condensation to the boiler, substantially as shown and described.

7. In a locomotive, the combination, with two high-pressure cylinders connected with the drive-wheels, of a rotary valve controlling the inlet and exhaust steam of the said cylinders, two rotary valves connected with the exhaust-port of the said first-named rotary valve, low-pressure cylinders connected with the driving-wheels and controlled by the said second rotary valve, a condenser into which the exhaust-steam from the said two rotary valves is discharged, an air-pump operated from one of the driving-wheels and connected with the said condenser to exhaust its vapors, a pump connected with the said condenser for returning the water of condensation to the boiler, and a pump for circulating cold water through the said condenser, substantially as shown and described.

8. The combination, in a locomotive, with two high-pressure cylinders and a rotary valve controlling both cylinders, of a low-pressure cylinder into which said rotary valve exhausts, having a rotary valve provided with a shaft rotated from the shaft of the first-named valve, the pistons of the several cylinders being connected with the driving-wheels, substantially as set forth.

JAMES DES BRISAY.

Witnesses:
 E. GRANT,
 *Of Vancouver, B. C., Law Clerk.*
 JOHN BOULTBEE,
 *Of Vancouver, B. C., Barrister-at-Law.*